(12) United States Patent
Tang et al.

(10) Patent No.: US 12,494,077 B1
(45) Date of Patent: Dec. 9, 2025

(54) DOCUMENT INFORMATION EXTRACTION USING VISUAL QUESTION ANSWERING AND DOCUMENT TYPE SPECIFIC ADAPTERS

(71) Applicant: Amazon Technologies, Inc., Seattle, WA (US)

(72) Inventors: Peng Tang, La Verne, CA (US); Pengkai Zhu, Pasadena, CA (US); Yusheng Xie, Redwood City, CA (US); Bhavan Ashwinbhai Jasani, San Francisco, CA (US); R. Manmatha, San Francisco, CA (US); Vijay Mahadevan, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 18/341,489

(22) Filed: Jun. 26, 2023

(51) Int. Cl.
  G06V 30/42    (2022.01)
  G06F 40/284   (2020.01)
  G06V 30/413   (2022.01)

(52) U.S. Cl.
  CPC ............ G06V 30/42 (2022.01); G06F 40/284 (2020.01); G06V 30/413 (2022.01)

(58) Field of Classification Search
  USPC ........................................................ 382/176
  See application file for complete search history.

(56) References Cited

U.S. PATENT DOCUMENTS

| | | | |
|---|---|---|---|
| 5,052,043 | A | 9/1991 | Gaborski |
| 5,475,768 | A | 12/1995 | Diep et al. |
| 5,542,006 | A | 7/1996 | Shustorovich et al. |
| 5,912,986 | A | 6/1999 | Shustorovich |
| 7,499,588 | B2 | 3/2009 | Jacobs et al. |
| 9,646,230 | B1 | 5/2017 | Prulhiere et al. |
| 10,354,168 | B2 | 7/2019 | Bluche |
| 10,489,682 | B1 | 11/2019 | Kumar et al. |
| 10,839,245 | B1 | 11/2020 | Dhillon et al. |
| 11,334,147 | B1 | 5/2022 | Upchurch |
| 2007/0002375 | A1 | 1/2007 | Ng |

(Continued)

OTHER PUBLICATIONS

Shaoqing Ren, et al., "Faster R-CNN: Towards Real-Time Object Detection with Region Proposal Networks", arXiv:1506.01497v3, Jan. 6, 2016, pp. 1-14.

(Continued)

*Primary Examiner* — Jacky X Zheng
(74) *Attorney, Agent, or Firm* — Alexander A. Knapp; Kowert, Hood, Munyon, Rankin & Goetzel, P.C.

(57) ABSTRACT

Document type specific adapters of a document analysis system are used to provide for additional document types or document specialization when generating answers to user submitted questions targeting information included in a document image provided with the user submitted question. The document analysis system receives a visual question answering (VQA) prompt comprising a document image and a question defining information to be extracted from the document image, generates tokens based on the document image and the question, and adjusts encoding of the tokens using document type specific adapters of a transformer model to extract the information from the document image. A classifier of the document analysis system may determine whether the document image matches a document type supported by the document type specific adapters.

20 Claims, 14 Drawing Sheets

(56) References Cited

U.S. PATENT DOCUMENTS

| | | | |
|---|---|---|---|
| 2018/0137350 | A1 | 5/2018 | Such et al. |
| 2022/0121679 | A1 | 4/2022 | Singh |
| 2022/0130499 | A1 | 4/2022 | Zhou |
| 2022/0382975 | A1 | 12/2022 | Gu |
| 2023/0153531 | A1 | 5/2023 | Geng |
| 2023/0154221 | A1 | 5/2023 | Gu |
| 2023/0222632 | A1 | 7/2023 | Polewczyk |
| 2023/0245418 | A1 | 8/2023 | Zhang |

OTHER PUBLICATIONS

Ross Girshick, et al., "Rich feature hierarchies for accurate object detection and semantic segmentation Tech report (v5)", arXiv"1311.2524v5, Oct. 22, 2014, pp. 1-21.

Ross Girshick, et al., "Selective Search for Object Recognition", Technical Report 2012, submitted to IJCV, Retrieved from http://disi.unitn.it/˜uijlings/SelectiveSearch.html, pp. 1-14.

Ali Furkan Biten, et al., "LaTr: Layout-Aware Transformer for Scene-Text VQA," arXiv:2112.12494v2 [cs.CV] Dec. 24, 2021, pp. 1-16.

"Yi-Lin Sung, et al., ""VL-Adapter: Parameter-Efficient Transfer Learningfor Vision-and-Language Tasks,"" arXiv:2112.06825v2 [cs.CV] Mar. 24, 2022, CVPR 2022, pp. 1-15."

U.S. Appl. No. 17/807,832, filed Jun. 20, 2022, Manmatha et al.

U.S. Appl. No. 17/230,784, filed Apr. 14, 2021, Dhandhania, et al.

U.S. Appl. No. 17/334,188, filed May 28, 2021, Srikar Appalaraju et al.

U.S. Appl. No. 16/843,807, filed Apr. 8, 2020 et al.

Minesh Mathew, et al., "DocVQA: A Dataset for VQA on Document Images," arXiv preprint: arXiv:2007.00398v3 [cs.CV] Jan. 5, 2021, pp. 1-23.

Minesh Mathew, et al., "InfographicVQA," arXiv preprint: arXiv:2104.12756v2 [cs.CV] Aug. 22, 2021, pp. 1-27.

Ruben Tito, et al., "Document Collection Visual Question Answering," arXiv preprint: arXiv:2104.14336v2 [cs.IR] Jun. 8, 2021, paged 1-15.

Amanpreet Singh, et al., "Towards VQA Models That Can Read," 2019 IEEE/CVF Conference on Computer Vision and Pattern Recognition (CVPR), pp. 8317-8326.

*Example VQA Prompt Comprising Document Image and Question*

Covid-19 Vaccination Record Card

| Last name | First name | MI |
|---|---|---|
| Smith | John | E |

| DOB | | Patient number | |
|---|---|---|---|
| Vaccine | Product name | Date | Healthcare Professional or Clinic Site |
| 1st dose | EL 3427 pfizer | 1.18.21 mm/dd/yy | NJH |
| 2nd dose | | mm/dd/yy | |
| Other | | | |
| Other | | mm/dd/yy | |

Pfizer EN9581 2/8/2021 NJH

Question: What is the date for the 1st dose covid-19?
Answer: 1/1/21
Question: Who is the manufacturer for first dose of covid-19?
Answer: pfizer

FIG. 7

Example VQA Prompt Comprising Document Image and Question

QUESTIONS
what is the price for eggs?
what is the transaction date?
what is the transaction time?
what is the vendor name?
what is the vendor address?
what is the tax amount included?
what is the GST tax rate percentage?

INPUT IMAGE                                                      EDIT

```
           The Market
          The Market Ltd
          1234 Main Street
          Any City TX. 98765

Date:  01/02/2020    Time: 4:30pm
Eggs              $3.99
Bread             $1.99
Milk              $2.99
                  ─────
TOTAL             $9.69
Sub-total         $8.97
Sales Tax          8.00
Tax amt.            .72
```

OPTIONS   ☑ Ensemble localization (best)

Example Answer Showing Extracted Data

ANSWER VISUALIZATION

```
            The Market
         ┌──────────────┐
         │The Market Ltd│
         │1234 Any Street│   ┌─────────────┐
         │Any City TX. 98765│ │Time: 4:30pm │
         └──────────────┘   └─────────────┘

Date: ┌──────────┐           ┌──────┐
      │01/02/2020│           │$3.99 │
Eggs  └──────────┘           └──────┘
Bread             $1.99
Milk              $2.99
                  ─────
TOTAL             $9.69
Sub-total         $8.97
                             ┌──────┐
Sales Tax                    │ 8.00 │
                             └──────┘
                             ┌──────┐
Tax amt.                     │ .72  │
                             └──────┘
```

PREDICTION – (QUESTION : ANSWER : CASED ANSWER(OPTIONAL) : CONFIDENCE(OPTIONAL)):
what is the price for eggs: $3.99
what is the transaction date: 01/02/2020
what is the transaction time: 4:30pm
what is the vendor name: The Market Ltd
what is the vendor address: 1234 Main Street, Any City, TX. 98765
what is the tax amount included: .72
what is the GST tax rate percentage: 8%

*FIG. 9B*

DOCUMENT INFORMATION EXTRACTION USING VISUAL QUESTION ANSWERING AND DOCUMENT TYPE SPECIFIC ADAPTERS

BACKGROUND

More and more applications are being implemented using network-accessible services, e.g., as part of a suite of services of a provider network or cloud computing environment. Such environments may, for example, provide virtualized computing services, storage services, and the like. A number of analytics or machine-learning related services may be implemented in some provider network environments, and may be used for numerous types of tasks, such as classification, demand prediction, and so on.

The accurate extraction of information from document images (e.g., from scanned versions of documents such as forms, cards, receipts, contracts, etc.) is a requirement for many types of organizations. For example, a large business or government entity may have to extract information from thousands of scanned or photographed documents, often obtained using less-than-ideal image capturing devices. Also, the documents may include unstructured data, such as handwritten data, stickers, etc. Furthermore, the granularity at which information regarding document details is required may vary, with some organizations requiring more detailed analysis than others. Some provider networks may offer a document analysis service for scalable automated extraction of document contents.

Traditionally, optical character recognition systems and related services comprise at least two subsystems: one which is responsible for detecting the locations of words within document images, and one which is responsible for recognizing the words. However, such systems may not be able to understand relationships and/or hierarchies between words in a scanned document that are distributed across the scanned document. Additionally, such systems may not be able to locate words in a document where the words are not oriented in a structured way, such as handwritten words or stickers that do not align with spaces provided in the document. Also, such systems may provide superfluous extracted data from a given scanned document beyond requested data that later needs to be parsed and/or may fail to provide the requested data from a given scanned document. Moreover, such systems may have difficulty providing support for analysis of additional document types.

BRIEF DESCRIPTION OF DRAWINGS

FIG. 7 illustrates an example scanned image (e.g. medical document) that may be included in a visual question answering (VQA) prompt as a document image, according to at least some embodiments.

FIGS. 9A and 9B illustrate an example scanned image (e.g., expense document) that may be included in a visual question answering prompt as a document image, according to at least some embodiments.

Figure 1:
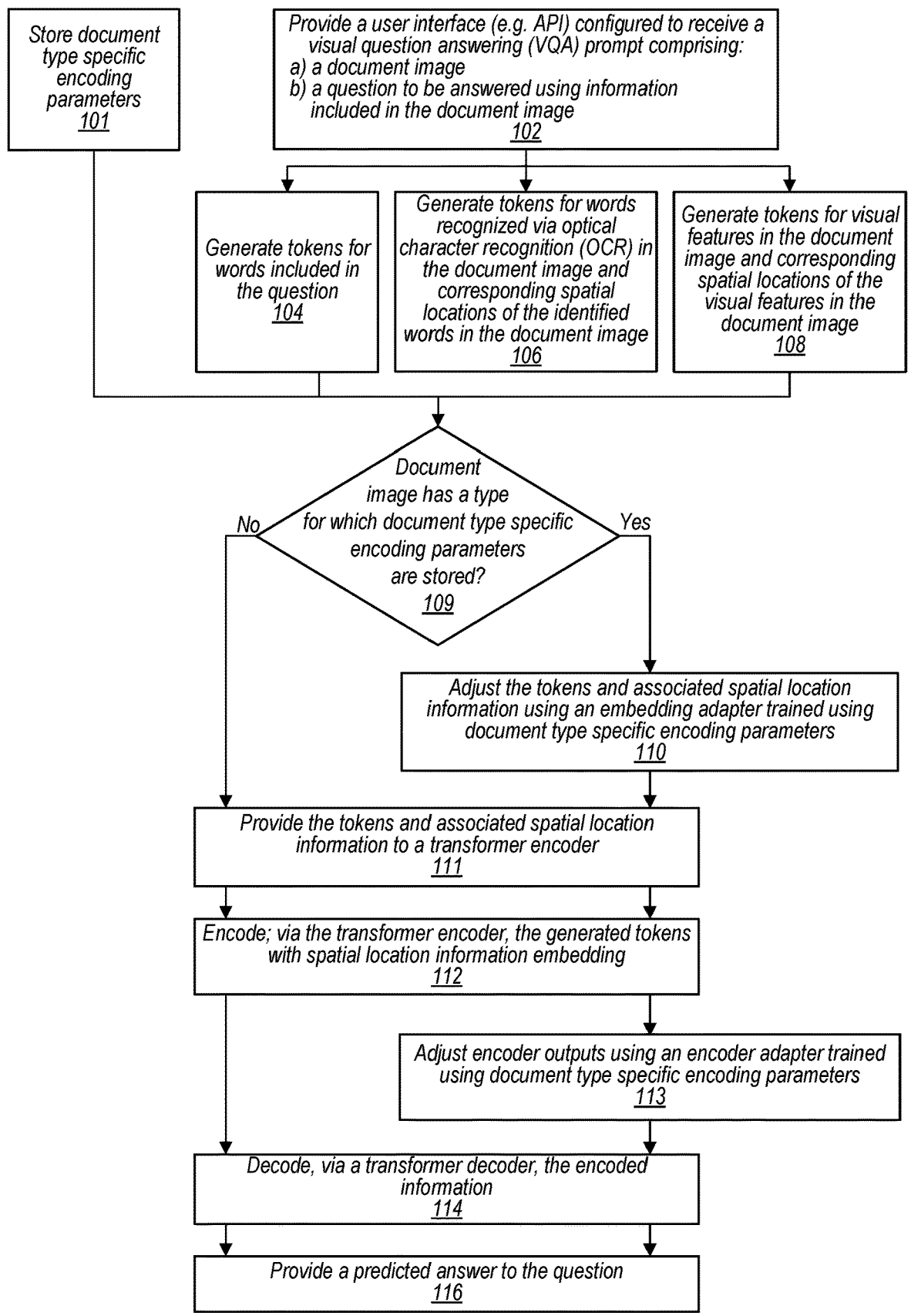
FIG. 1 is a flow diagram illustrating a process performed by a document analysis system to extract information from a document image, wherein the document analysis system receives a visual question answering (VQA) prompt comprising a document image and a question defining information to be extracted from the document image, generates tokens based on the document image and the question, and adjusts the tokens using document type specific adapters to extract the information from the document image, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for analyzing the content of document images (such as scanned representations of documents) using a visual question answering (VQA) transformer model implemented using document type specific adapters. The document type specific adapters may adjust tokens and/or token embedding to better target information of interest targeted by a user provided query (also referred to herein as a "question") in a document image of a specific document type. For example, document type specific adjustments to tokens or token embeddings may cause the transformer model to provide more accurate results to queries for a given document type than if the document type specific adjustments to tokens or token embeddings was not performed (in which case the results may not take into account additional knowledge about relationships typically present in documents of a specific type, which can be inferred based on document type).

As an example, a document type may be a medical record, and the document type specific adjustments may adjust a token generated for text located in the medical record, wherein the text is located in a location in the medical record where medical records can be inferred to list a patient name. This adjustment can function as though an additional "hint" was provided to the transformer model that the text is likely a patient name. This may improve performance of the transformer model as opposed to just understanding the OCR characters of the text and the location of the text in the document. Thus, in this example, medical record specific knowledge may additionally be used in answering the VQA prompt by applying the document specific encoding parameters via token and/or embedding adjustments.

Generally speaking, VQA may allow the user to provide a document image along with a question regarding the document image to extract an answer to the question. In some embodiments, VQA may be implemented using a transformer model that is configured to understand both visual information found in a document image and a question being asked regarding the document image. To accomplish this, the transformer model may combine computer vision techniques that generate tokens for a given image and natural language processing techniques that generate tokens for a user submitted question regarding the given image. The transformer model may be a multi-modal transformer that is configured to return a predicted answer to a user submitted question based on multiple kinds of tokens (e.g., tokens generated using computer vision techniques and natural language processing techniques), wherein the answer is determined from tokens extracted from the document image and the question in a VQA prompt. For example, the transformer model may generate tokens representing different modes (e.g., visual features, spatial features, textual features) that are encoded into the transformer model. Furthermore, the transformer model may be trained for analysis of various types of documents.

In some instances, training the transformer model to answer questions directed towards additional types of documents (types of documents that were unsupported but now are requested to be supported) may result in sample-level regression. Likewise, training the transformer model using a disproportionate quantity of training data specific to a particular document type may result in sample-level regression. For example, such disproportionate training using a particular document type may skew the transformer model to provide less accurate performance overall for other types of documents, other than the particular document type that was disproportionally used to train the transformer model.

For example, sample-level regression describes situations wherein an updated model performs worse on some individual samples compared to a previous version of the same model, such as the transformer model that was previously trained for an initial set of documents comprising a variety of document types or different types of documents. For example, a transformer model may initially be trained to predict answers to questions regarding financial documents, such as income statements and balance sheets. Subsequently, the transformer model may be requested by a VQA prompt to answer questions for additional types of documents, such as medical documents (e.g., vaccination cards, medical consent forms, etc.). The updated transformer model may however experience sample-level regression and predict certain samples of financial documents (or samples of previously supported document types) with worse results after additionally being trained on the medical documents. In some instances, sample-level regression may be caused by overfitting that occurs due to the updated transformer model being trained using a larger dataset of various types or different types of documents.

One way to avoid sample-level regression while also supporting additional document types or document type specialization (e.g., increase performance of the transformer model for the additional document types to meet a threshold performance level and/or answering specialized questions for a particular document type) may be to use multiple specialized models that comprise encoders and decoders that have been specifically trained for each document type. However, such training for individual types of documents may require multiple versions of the transformer models to be stored. Also, each of the versions of the transformer model may require ongoing support to keep the specialized versions trained to account for evolving uses of the different document types. The respective parameters for each of the models may furthermore be greater in size than the previous versions due to an increased number of parameters that are associated with the additional document types. This increase in the number of parameters may impose greater storage and processing requirements, such as with regard to graphical processing unit (GPU) memory requirements. Furthermore, maintaining each of the versions of the transformer model for each of the document types may be difficult and may be cost prohibitive as the number of document types that may need to be supported continues to increase. As can be seen, updating a transformer model to support additional document types and mitigating sample-level regression presents a non-trivial challenge.

In some embodiments, document type specific adapters along with document type specific encoding parameters may be used to support additional document types for which an encoder and a decoder of a transformer model that implements VQA has not been specifically trained. For example, document type specific embedding adapters may be used to adjust encoding of document type specific encoding parameters for a specific document type. In some embodiments, the document type specific adapters may be light-weight linear adapters that adjust various tokens according to document type specific encoding parameters. For example, the document type specific embedding adapters may adjust respective embeddings for tokens (wherein the tokens may represent document features corresponding to different modes such as visual features, spatial features, and textual features) according to the document type specific encoding parameters. The encoder of the transformer model may subsequently encode the adjusted tokens and/or adjusted token embeddings. In some embodiments, a document type specific encoder adapter may also adjust outputs from the encoder according to the document type specific encoding parameters and provide the adjusted outputs to the decoder of the transformer model to provide information of interest targeted by a user provided question for a document image of a specific document type. Adding document type specific adapter layers that use document type specific encoding parameters may reduce the number of trainable parameters used for the encoder/decoder and mitigate overfitting/sample-level regression. For example, because the document type specific embedding/encoding adapters are added on top of the pre-trained encoder/decoder of the transformer model, the encoder/decoder of the transformer model may not be required to be trained again and may continue to function well for a variety of document types (instead of suffering from sample-level regression by being over-trained on a specific document type). By reducing the number of trainable parameters, the encoder/decoder of the transformer model may have fewer number of parameters and have fewer opportunities to overfit to the training data and thus worsen the sample-level regression.

In some embodiments, a classifier of a document analysis system may be a classification machine learning model used to predict a document type of a document image from a VQA prompt. The classification model may make a prediction of the document type based on information included in the VQA prompt. The document analysis system may then use the prediction to determine whether the predicted document type is a type for which there are document type specific encoding parameters stored in a parameter pool. The document analysis system may subsequently determine whether a question regarding the document image from the VQA prompt is one that is typically associated with the predicted type of document, wherein typical questions for a given document type are stored for a plurality of different document types. Upon determination that the question is one of the typical ones that is stored for the predicted document type, the document image may be classified as the predicted document type. Based on the predicted document type, the document image document analysis system may provide document type specific encoding parameters associated with the determined document type to document type specific adapters of the transformer model.

The present disclosure relates to methods and apparatus for analyzing the content of document images (such as scanned representations of documents) using a VQA technique implemented using document type specific adapters, document type specific encoding parameters, and an encoder/decoder of the transformer model, wherein the document type specific adapters may be trained to adjust encoding of tokens and/or token embeddings based on document type specific encoding parameters and use the adjusted encoding of the tokens and/or token embeddings to provide information of interest targeted by a user provided question about a document having a specific document type.

As one skilled in the art will appreciate in light of this disclosure, certain embodiments may be capable of achieving various advantages, including some or all of the following: (a) configuring a VQA system trained on general document types to additionally support specialization for specific document types, without sacrificing performance of the VQA system with regard to general document types or with regard toother types of specific document types, (b) extending the capabilities of a VQA system to support document information extraction for additional document types, (c) mitigating sample-level regression, and (d) providing light-weight layers for document information extraction for additional document types instead of requiring training of multiple versions of an entire transformer model trained for each of the additional document types, amongst various other advantages as described herein and as will be apparent to one having ordinary skill in the art.

According to at least some embodiments, a system that implements a document analysis service, as described herein, may comprise one or more computing devices. The computing devices may include instructions that upon execution on or across one or more processors cause the computing devices to obtain an indication of a data set comprising one or more documents (e.g., in scanned or photographed form) which are to be used as input to train a set of machine learning models for recognizing or extracting the contents of the documents. In at least some embodiments, the computing devices may be part of a network-accessible document analysis service, and the data set may comprise scanned or photographed images of the documents. In some embodiments, the indication of the training data set may be provided by a client of the document analysis service using one or more programmatic interfaces implemented by the service, such as a web-based console, application programming interfaces (APIs), command line tools, graphical user interfaces and the like.

After the transformer model and/or document type specific adapters have been trained, they may be stored, e.g., at a repository of a document analysis service. In response to programmatic requests for content recognition of various target documents, the trained versions of the transformer models/adapters may be utilized to generate and provide details of the contents (e.g., the specific words, numeric values, tokens, etc. which make up entities such as dates, signatures and the like) of the target documents. In some cases, the extracted content details may be provided to a client of the document analysis service; in other cases, the extracted content details may be fed as input to one or more downstream analysis services (e.g., services which initiate actions based on the contents) and/or storage services (at which records indicating the extracted contents may be stored).

FIG. 1 is a flow diagram illustrating a process performed by a document analysis system to extract information from a document image, wherein the document analysis system receives a visual question answering (VQA) prompt comprising a document image and a question defining information to be extracted from the document image, generates tokens based on the document image and the question, and adjusts the tokens and/or token embeddings using document type specific adapters, and uses the adjusted tokens and a transformer model to extract the information from the document image, according to some embodiments.

At block 101, document type specific encoding parameters may be stored in a document analysis system. In some embodiments, the document type specific encoding parameters may be parameters that are used by document type specific embedding adapters to adjust token embeddings that are generated from a visual question answering (VQA) prompt. In some embodiments, the document type specific embedding adapters may be linear adapters. In some embodiments, the document type specific encoding parameters for the linear adapter may be learned during training on document type specific data (e.g., document images of a specified type). Training and application of document type specific embedding adapters are further discussed below with regards to FIG. 5A-5B. The generation of tokens from the VQA prompt are further discussed below at blocks 102-108. In some embodiments, the document type specific encoding parameters may be parameters that determine adjustments to be made to the token embeddings (or other vectors) that represent each input token for the transformer model. Storing the document specific encoding parameters and applying the document specific encoding parameters at input and output adapters of a transformer model in order to adjust encoding of tokens and/or token embeddings are further discussed below with regard to FIGS. 2-5.

At block 102, a customer provides, via a user interface (such as an application programmatic interface (API)), a visual question answering (VQA) prompt to the document analysis service. The visual question answering (VQA) prompt may comprise a document image, wherein the document image comprises information to be extracted. In some embodiments, the document image may be a document of specific document type for which the encoder/decoder of the transformer model has not been specifically trained. For example, the transformer model may not be able answer specialized questions for a specific document type that is unsupported, or alternatively, the transformer model may provide results with a lower confidence level than can be achieved by using document specific adjustments, as described herein. In some embodiments, the VQA prompt may also include a user submitted question that is used to identify targeted information to be extracted from the document image. The question may be provided using natural language in an un-structured format. In some embodiments, the document analysis service may provide an API formatted to receive the VQA prompt, for example a web-based interface may route a received document and question to the API in a format defined for the API.

At block 104, plain language token generator may parse the question into words and may further generate tokens for respective ones of the words included in the question. Also, position information indicating an order of the respective words in the question may be encoded with the tokens. For example, word embedding may be performed to embed the tokens and associated order information into the encoded model.

At block 106, tokens are generated for words included in the document image, wherein the words are recognized using an optical character recognition (OCR) process. Also, spatial location information for the words, such as a position and/or size of a bounding box comprising the respective word may be encoded. In some embodiments, pre-training may be performed to de-noise how the transformer model handles the spatial location information prior to using the transformer model to process a customer submitted visual question answering (VQA) prompt.

At block 108, tokens are generated for visual features in the document image and spatial location information for the visual features such as a position and/or size of a bounding box comprising the respective visual feature may be encoded. Pre-training and fine-tuning may also be performed to improve how the transformer model handles spatial location information for visual features prior to using the model to process a customer submitted visual question answering (VQA) prompt. In some embodiments, the use of visual features embedding may be optional.

At block 109, the document analysis service may determine whether the document image corresponds to a document type for which document type specific encoding parameters are stored. In some embodiments, a document classifier and question matching module may be used in a VQA prompt workflow to determine whether a document type of a received document included in a VQA prompt is supported by the document type specific encoders. In some embodiments, document classification and a parameter selection performed in the VQA prompt workflow may determine document type specific encoding parameters to be provided to the input and output adapters of the transformer model. The document classification parameter selection is further discussed in FIGS. 2-3. Upon a determination that the document type of the document included in the VQA prompt is supported by the input and output adapters, the tokens and/or token embeddings may be adjusted to apply document specific parameters, such as by an input adapter at block 110, and the adjustments may be compensated for at an output of the encoder, such as at an output adapter at block 113. Upon a determination that the document type of the document image is not supported by document type specific encoders, the flow diagram flows skips blocks 110 and 113.

At block 110, upon a determination that the document image included in the VQA prompt is a document of a type for which document type specific encoding parameters are stored, the document analysis service may adjust the tokens and/or token embeddings, such as associated spatial location information, using an embedding adapter trained using documents of the specific document type to generate document type specific encoding parameters. In some embodiments, the embedding adapter may be a light-weight linear adapter that adjust various tokens and/or token embeddings according to document type specific encoding parameters. Training and application of document type specific embedding adapters are further discussed below with regards to FIG. 5A-5B.

At block 111, the generated tokens (generated at 104, 106, and 108) are provided to the encoder and, at block 112, the generated tokens are encoded into the encoder/decoder of the transformer model with spatial location information embedding as a multi-modal model that includes a textual mode, a spatial mode, and (optionally) a visual mode. In some embodiments, blocks 111 and 112 may be performed as a single step. In some embodiments, subsequent to a determination that the document image has a type for which document type specific encoding parameters are stored, the encoder may take in adjusted token embeddings as described at block 110. The adjustment of the token embeddings using the document type specific embedding adapter will be further discussed in FIGS. 4-5. In some embodiments the encoder may comprise a self-attention mechanism and a feed-forward neural network. The self-attention mechanism may accept input encodings from the previous encoder layers and weigh their relevance to each other to generate output encodings. The feed-forward neural network further processes each output encoding individually. These output encodings are then passed to the next encoder layer as its input, as well as to the decoder. In some embodiments, if the document image has a type for which document type specific encoding parameters are stored, the output encodings may be provided to a document type specific encoding adapter.

At block 113, subsequent to a determination that the document image has a type for which document type specific encoding parameters are stored, the document analysis service may adjust the encoder output using an encoding adapter trained using document type specific encoding parameters. In some embodiments, similar to the embedding adapter discussed above at block 110, the encoding adapter may also be a light-weight linear adapter that adjust various tokens according to document type specific encoding parameters that may be trained according to the parameters that are directed towards documents of a specific type. Training and application of document type specific encoding adapters are further discussed below with regards to FIG. 5A-5B.

At block 114, the encoded information may be decoded via a decoder of the transformer model. The decoder may comprise three main components: a self-attention mechanism, an attention mechanism over the encodings, and a feed-forward neural network. The decoder may function in a similar fashion to the encoder, but an additional attention mechanism may be inserted which instead draws relevant information from the encodings generated by the encoders. In some embodiments, the decoder may use auto-regression. Furthermore, in some embodiments, upon a determination that the document image has a type for which document type specific encoding parameters are stored, the decoder may take in the adjusted encoder outputs as described in block 113. The adjustment of the encoder output using the document type specific encoder adapter will be further discussed in FIGS. 4-5.

At block 116, a predicted answer to the question included in the visual question answering (VQA) prompt is provided based on the decoded output of the decoder. The predicted answer may comprise information extracted from the document image provided along with the question as part of the VQA prompt.

Figure 2:
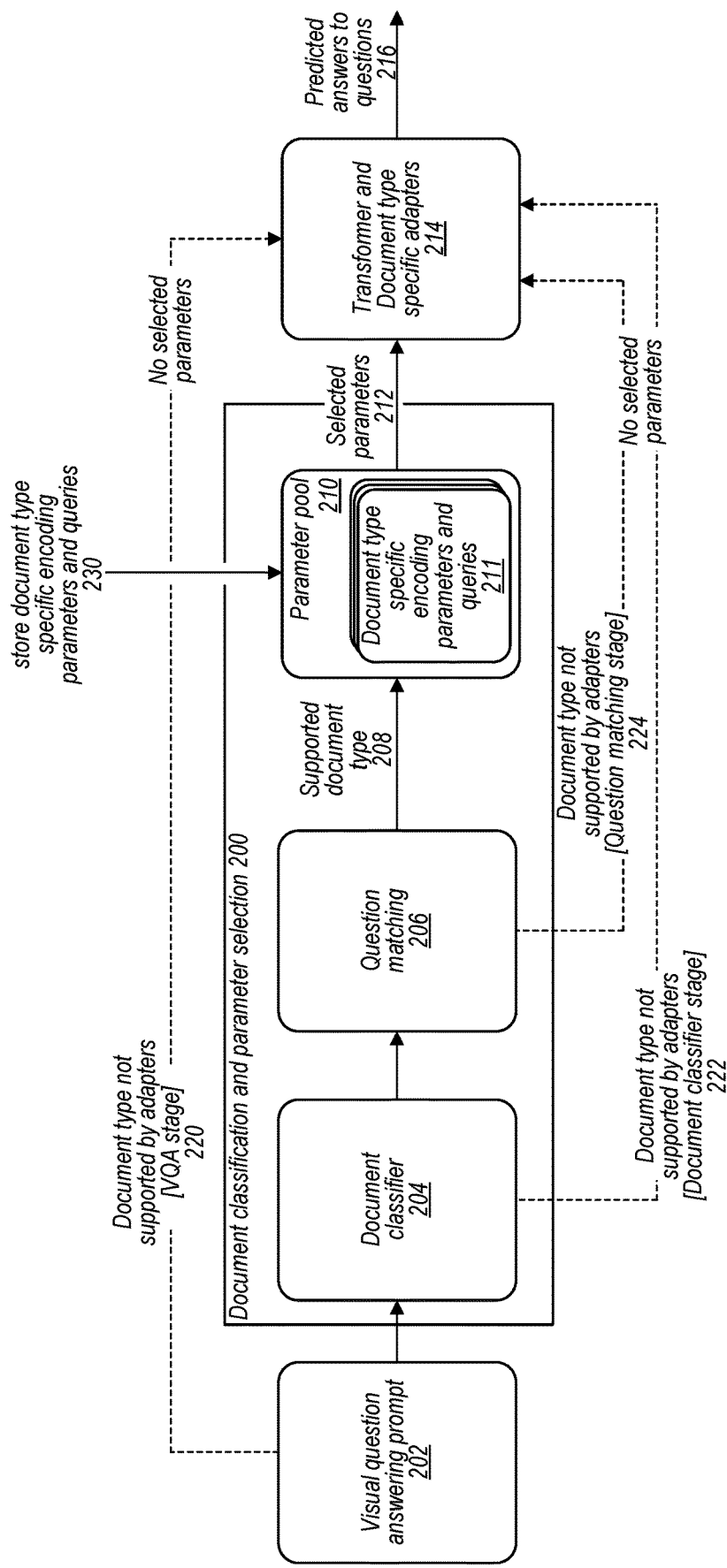
FIG. 2 illustrates a high-level view of a visual question answering (VQA) prompt pipeline that classifies a document image of a VQA prompt and provides document type specific encoding parameters to document type specific adapters to predict answers to questions targeting information to be extracted from the document image, according to some embodiments.

FIG. 2 illustrates a high-level view of a visual question answering (VQA) prompt pipeline that classifies a document image of a VQA prompt and provides document type specific encoding parameters to input and output adapters of a transformer model to predict answers to questions targeting information to be extracted from the document image, according to some embodiments.

In some embodiments, the visual question answering prompt 202 may be received by a document analysis service as part of the VQA prompt pipeline. A VQA prompt may comprise a document image and a question targeting information to be extracted from the document image. Additionally, the document image may be given information regarding its document image type. For example, the document analysis system may be given a VQA prompt having a document image already tagged with metadata indicating its document type. In some embodiments, based on the given metadata, the VQA prompt pipeline may determine that the document type is not supported by document type specific adapters at the VQA stage 220 and may indicate to a transformer and document type specific adapters 214 to not apply any document type specific adapters. In some embodiments, the document analysis system may determine that the document type is not supported by the adapters based on a determination that the document type given in the metadata matches a document type initially supported in the version of the transformer for which the encoder/decoder of the transformer model were trained. In some embodiments, a document type may be inferred, even if not explicitly indicating in metadata, and a decision as to whether the document type is supported by the document type specific adapters may be determined based on the inference.

In some embodiments, the VQA prompt pipeline may perform document classification and parameter selection 200 comprising a document classifier 204, a question matching module 206, and a parameter pool 210. In some embodiments, the document classifier 204 may predict the document type of the document image. Based on the document type prediction, further document classification and parameter selection analysis may be performed. For example, based on a prediction made by the document classifier 204, the document classifier 204 may indicate to the transformer and document type specific adapters 214 that a document type of a given document image is a type that is not supported by the document type specific adapters (e.g., a type for which document type specific parameters 211 are not stored in the parameter pool 210). This may be performed at the document classifier stage 222.

In some embodiments, if the document type predicted by the document classifier 204 is a supported document type (e.g., a type for which document type specific parameters 211 are stored in the parameter pool 210), the question matching module 206 of the document classification and parameter selection pipeline 200 may determine whether a question about the document image included in the VQA prompt matches a question type known to be associated with the predicted document type. In some embodiments the document analysis service may determine that the document type is not supported at the question matching stage 224 if the question from the VQA prompt does not match one of the stored questions associated with the predicted document type. For example, the document analysis service may determine that the predicted document type is not supported by the adapters at the question matching stage 224 based on the question included in the VQA prompt not matching one of the stored questions associated with the predicted document type. In some embodiments, the questions associated with the predicted document types may be stored in the parameter pool 210 as one more document type specific encoding parameters and queries 211.

Upon a determination that the adapters support the predicted document type and the question from the VQA prompt matches one of the questions associated with the predicted document type, an indication of the supported document type 208 is sent to the parameter pool to determine the encoding parameters to be provided for the transformer and document type specific adapters 214. In some embodiment, the parameter pool 210 may store one or more document type specific encoding parameters. The parameter pool 210 may allow one or more users to store additional document type specific encoding parameters and queries 230. In some embodiments, the document type specific encoding parameters may be used to train the document type specific adapters to answer questions according to a given document type as further discussed in FIGS. 4-5.

Based on the document classification and parameter selection 200 of the VQA prompts pipeline, the transformer and document type specific adapters 214 may receive selected parameters 212. In some embodiments the parameters may be encoding parameters that are to be used by the document type specific adapters to generate predicted answers to question 216. The prediction of answer to questions 216 based on the transformer and document type specific adapters 214 will be further discussed in FIGS. 4-5.

Figure 3:
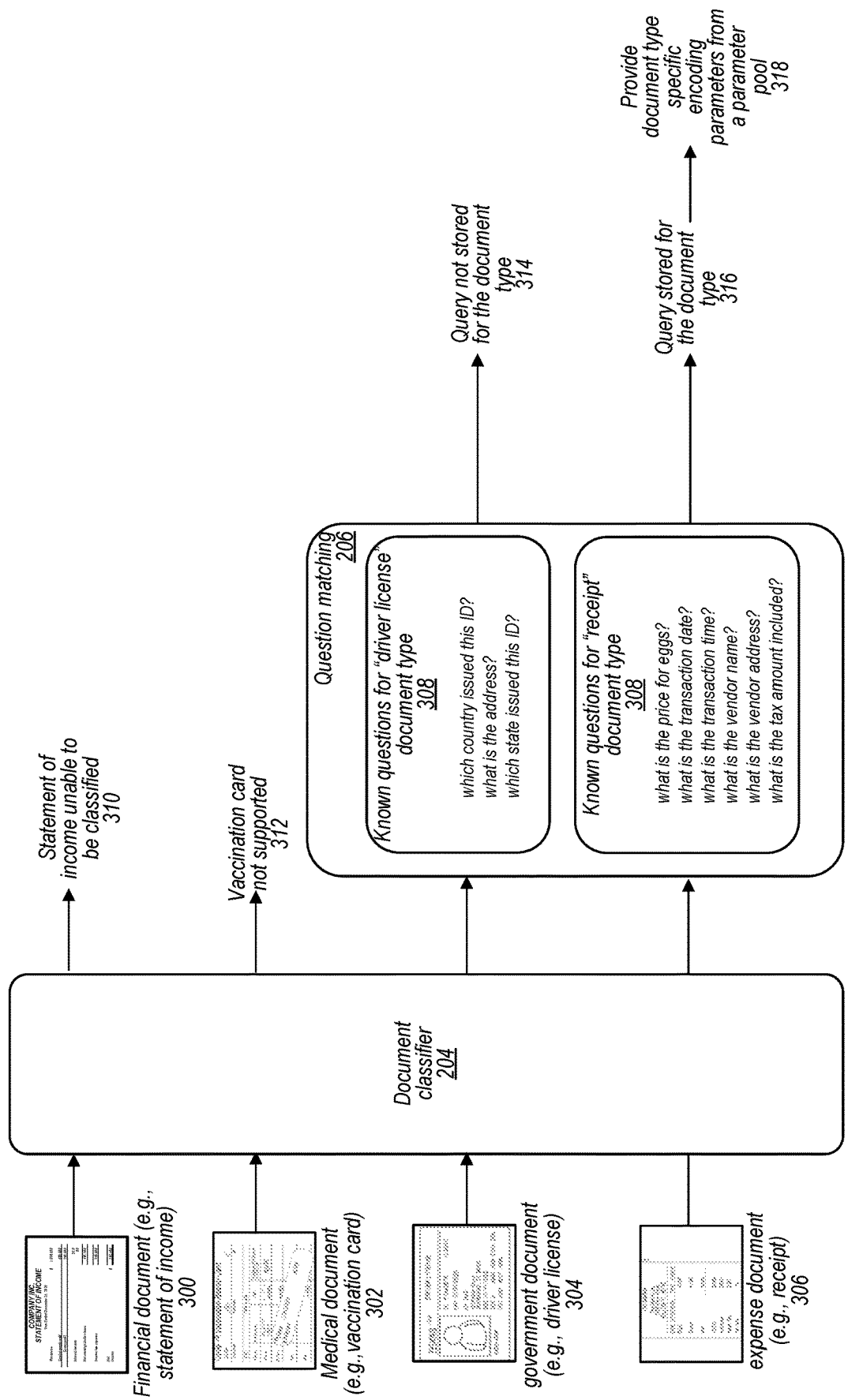
FIG. 3 illustrates a more detailed view of an example document classification and parameter selection portion of the VQA prompt pipeline that classifies a document image of a visual question answering (VQA) prompt and provides document type specific encoding parameters based on the classification, according to some embodiments.

FIG. 3 illustrates a more detailed view of an example document classification and parameter selection that classifies a document image of a visual question answering (VQA) prompt and provides document type specific encoding parameters based on the classification, according to some embodiments.

In some embodiments a document classifier 204 may receive various VQA prompts containing document images of differing types. For example, in various VQA prompts, the document classifier may receive a financial document 300, a medical document 302, government document 304, and an expense document 306. Financial documents 300 may include, income statement, balance sheet, cash flow statement, tax returns, bank statements, loan agreements, financial projections, purchase orders, etc. In some embodiments, medical documents 302 may include, medical history, physical exam, laboratory test results, imaging reports, medication list, vaccination records, medical consent form, advance directives, etc. Government documents 304 may include birth certificate, driver's license, passport, social security card, tax forms, business license, building permit, voter registration. Expense documents may include 306, government documents, expense documents, receipts, invoices, bank statements, credit card statements, expense reports, purchase orders, payroll records. The types of documents may not be limited to the four types listed here and may include various other types of documents. In some embodiments, the level of generality of the document types may differ and the scope of the document types may overlap. For example, a document type may indicate "hospital documents" which may overlap with some financial documents as well as medical documents. In some embodiments, a document type may be a subgroup of the document such as "vaccination cards" which may fall under the medical document type. In some embodiments, the document classifier 204 may be trained to differentiate document types for overlapping categories based on the question included with the VQA prompt. Also, for document types that are subgroups of a larger group, the classifier may first test to see if the document can be classified as the more specific document type, and if not then test the document for classification in a more general group.

In some embodiments, the document classifier 204 may predict the type of document as part of the document classification and parameter selection pipeline discussed in FIG. 2. In some embodiments, the document classifier 204 may be a deep learning neural network used for image classification tasks (such as convolutional neural network (CNN) model) that is trained to classify an input image into one of a plurality of trained document types based on features such as layout, text, and visual elements. In some embodiments, the document classifier 204 may pass the document image obtained from the VQA prompt through a series of convolutional layers extract to features from the image, reduce the dimensionality of the feature maps, and predict the document type. In some embodiments, the document classifier 204 may be various types of classifiers such as a supported vector machine (SVM) model or a recurrent neural network (RNN) model. In some embodiments, the document classifier 204 may be unable to generate a prediction of the document type, and may subsequently be labeled as an "unknown" type. In some embodiments, the document classifier 204 may determine that a document is unable to be classified based on a metadata of the document image from the VQA prompt. For example, the document classifier 204 may receive metadata indicating that the document image is not to be classified or a metadata that indicates that the document is of a type not supported by the document type specific adapter. In some embodiments, the document classifier 204 may not be trained to detect certain types of documents apart from the documents that are selected to be supported by the document type specific adapters. For example, the document classifier 204 may determine that the document type "statement of income" is unable to be classified 310 based on the document classifier 204 not being trained to detect documents labeled under "financial documents."

In some embodiments, the document classifier 204 may predict the document type and determine that the predicted type is not a type that is supported. For example, the document classifier may predict that a vaccination card is a medical document, but may determine that medical documents are not supported by the adapters. In some embodiments, a document type may not be supported by the document type specific adapters due to document type specific encoding parameters and/or queries not being stored in a parameter pool. In some embodiments the document classifier 204 may determine that the document image is an "unknown" type based on the document type not being supported.

In some embodiments, the document classifier 204 may determine that a document type is supported, but the questions being asked regarding the document image of the document type do not match known questions for the document type. For example, the document classifier 204 may predict that a driver license is a government document type, but a question in the QVA prompt for the driver license may not be found in a list of queries for the government document type stored in the parameter pool (or stored elsewhere and accessed by the classifier). For example, a question for the document image may be "when was the last driving violation", but the questions stored for the government document types may not have the matching question stored. In some embodiments, the lack of a stored question may be due to the document classifier making a wrong prediction as to the document type. For example, a vaccination card may be incorrectly classified as government document. Even though the government document type is one that is supported by the document type specific adapters, a question such as "what is the vaccination date" asked in the VQA prompt may not be found under the government document type. Based on the lack of a matching query stored for the document type in the question matching stage 206, the document classifier may determine that the document image is of an "unknown" type.

In some embodiments, the document classifier 204 may predict the document type that is supported by the document type specific adapters and for which there are documents type specific encoding parameters stored in the parameter pool. For example, the document classifier 204 may predict that the receipt 306 is an expense document, and that the question "what is the transaction date?" is one that is stored for the predicted document type 316. Based on the determination that the query is stored for the document type 316, the document analysis service may apply document type specific encoding parameters from the parameter pool 318 (as further discussed in FIGS. 4-5).

Figure 4:
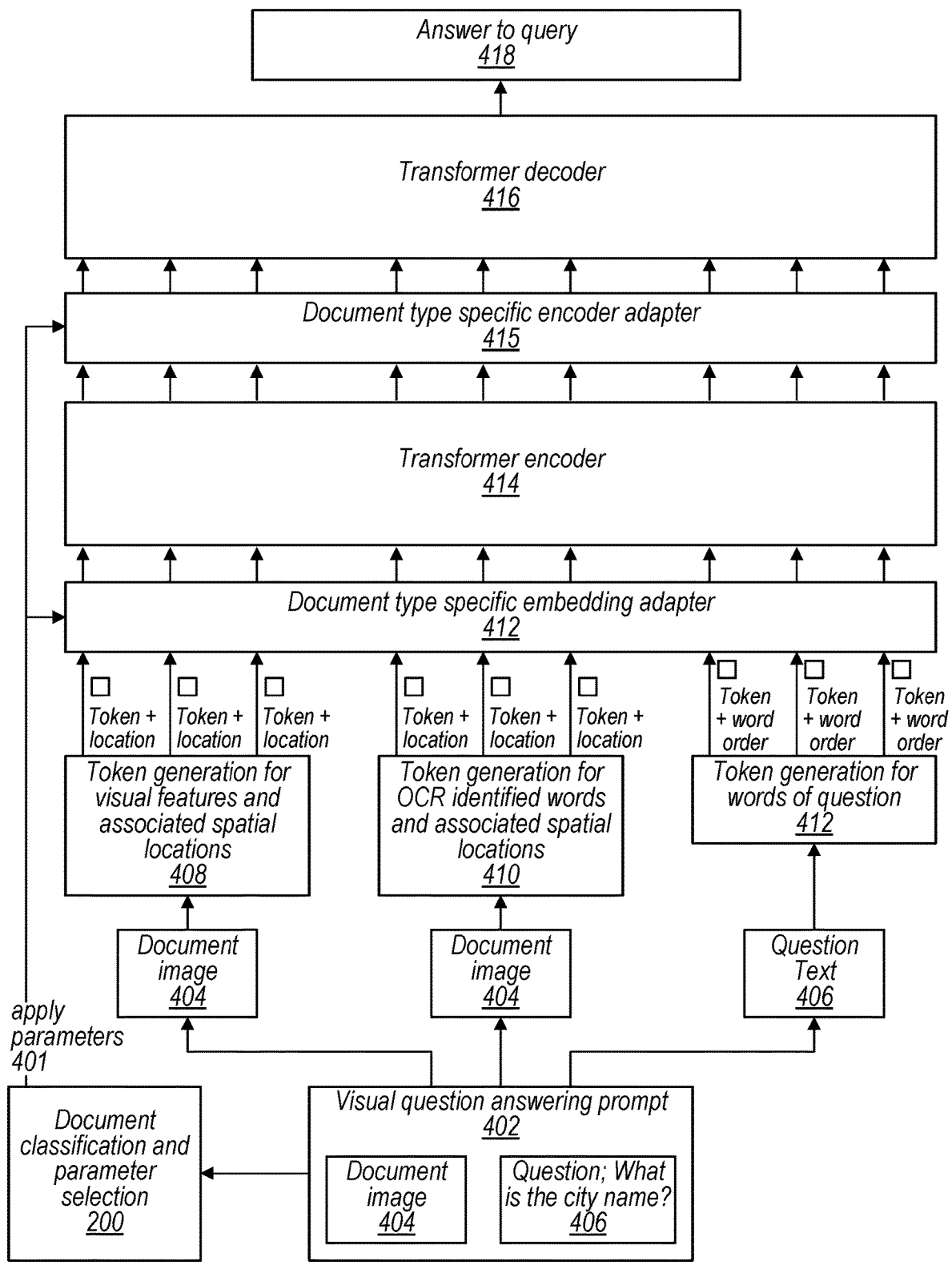
FIG. 4 illustrates a high-level view of components of a document analysis system that receives a visual question answering (VQA) prompt, provides encoding parameters that are determined according to a document classification to document type specific adapters of the document analysis system (if applicable), and uses a transformer model to extract targeted information from a document image included in the VQA prompt, according to some embodiments.

FIG. 4 illustrates a high-level view of components of a document analysis system that provides a visual question answering (VQA) prompt, applies encoding parameters that are determined according to a document classification to document type specific adapters, and uses the transformer model to extract targeted information from a document image, according to some embodiments.

As mentioned above, a visual question answering prompt 404 includes a document image 404 and an associated question 406 that is targeting information included in the document image. The document image and question are provided to token generation modules 408, 410, and 414 that generate tokens along with spatial location information or word order information. In some embodiments, the document classification and parameter selection 200 (further discussed in FIGS. 2-3) may determine that the document image 404 is of a document type that is supported by a document type specific embedding adapter 412 and document type specific encoder adapter 415. In some embodiments a transformer model may comprise the document type specific embedding adapter 412, the document type specific encoder adapter 415, transformer encoder 414, and the transformer decoder 416. In other embodiments, the transformer model may comprise the transformer encoder 414 and the transformer decoder 416, wherein the document type specific embedding adapter 412 and the document type specific encoder adapter 415 are separate layers that are outside of the transformer model but are configured to receive and provide adjustments to the encoding.

In some embodiments, the document type specific encoding parameters determined at the document classification and parameter selection 200 are provided to the document type specific embedding adapter 412 and document type specific encoder adapter 415. In some embodiments, the document type specific embedding adapter 412 and the document type specific encoder adapter 415 may be trained using training data comprising documents of the specific document type, as further discussed in FIG. 5A-5B. In some embodiments, the embedding adapter 412 may receive as input the tokens and token embeddings and adjust them according to the document encoding parameters that are stored in the parameter pool. The adjusted tokens and/or token embeddings are provided to the encoder 414. The adjusted tokens and/or adjusted token embeddings (e.g., spatial locations) are embedded into the model and the output of the transformer encoder 414 may be further adjusted based on the document type specific encoder adapter 415. The adjusted encoder outputs may then be provided to the transformer decoder 416 and the adjusted encoder output subsequently decoded to generate answer 418 to the question 406. More details about the respective components are further provided in FIGS. 5A-5B.

Figure 5A:
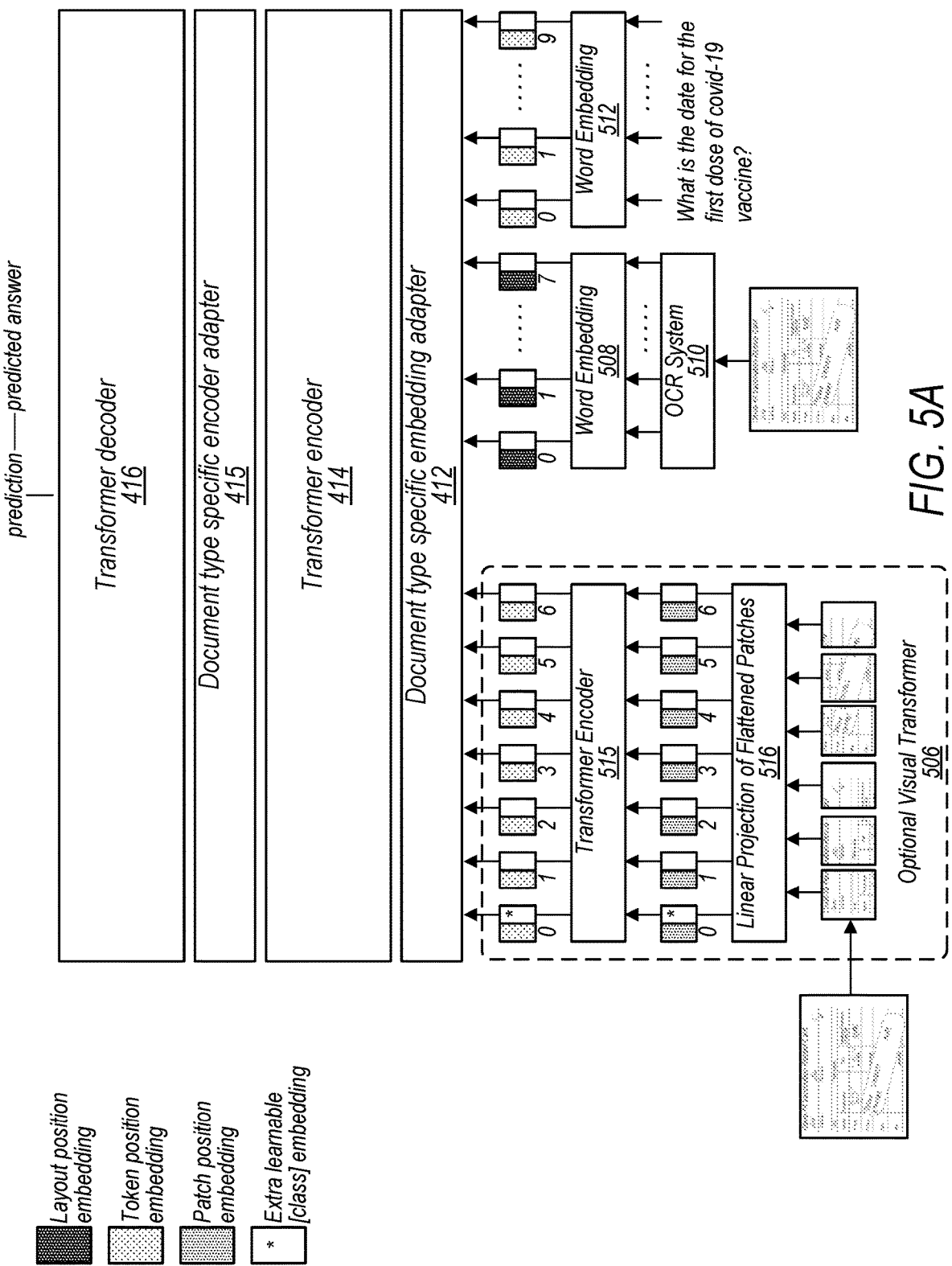
FIG. 5A illustrates a more detailed view of an example configuration of a portion of a document analysis system that uses a visual question answering (VQA) prompt to generate token embeddings, according to some embodiments.

FIG. 5A illustrates a more detailed view of an example configuration of a portion of a document analysis system that uses a visual question answering (VQA) prompt to generate token embeddings, according to some embodiments.

Is some embodiments, the token generation for words of question module 412 (as shown in FIG. 4) includes a word embedding module 512 that takes the words of the question as inputs and outputs tokens for each word and associated token position embedding information that is provided to the document type specific embedding adapter 412 (or to transformer encoder 414 directly if the document analysis service determines in the document classification and parameter selection that a document type of the document included in the VQA prompt is not supported by the document type specific adapters).

In some embodiments, the token generation for OCR identified words and associated spatial locations module 410 (as shown in FIG. 4) comprises an optical character recognition (OCR) system 510 that takes the document image as an input and uses OCR to identify characters in the document image that make up words. For example, a medical document image such as a vaccination record card, may serve as an input to the OCR system. The identified characters of the words are provided to a word embedding module 508 that generates tokens for the respective words along with layout information of the words in the document image that are embedded with the tokens (e.g., layout position embedding). For document types that are supported by the document type specific adapters, the word tokens and spatial location information (e.g., token embeddings) may be adjusted by the document type specific embedding adapter 412 before being encoded into the model using transformer encoder 414 as further discussed in FIG. 5B.

In some embodiments, a token generation for visual features and associated spatial locations module 408 (as shown in FIG. 4) may be included, which comprises a visual transformer 506. The visual transformer (ViT) may comprise a linear projection of flattened patches module 516, which takes portions of the document image (e.g., patches) as inputs and outputs the patches with extra learnable class information as well as patch position information. The transformer encoder 515 of the visual transformer 506 transforms the patches and class information into tokens representing visual features found in the document image as well as token position information for the tokens corresponding to visual features.

Figure 5B:
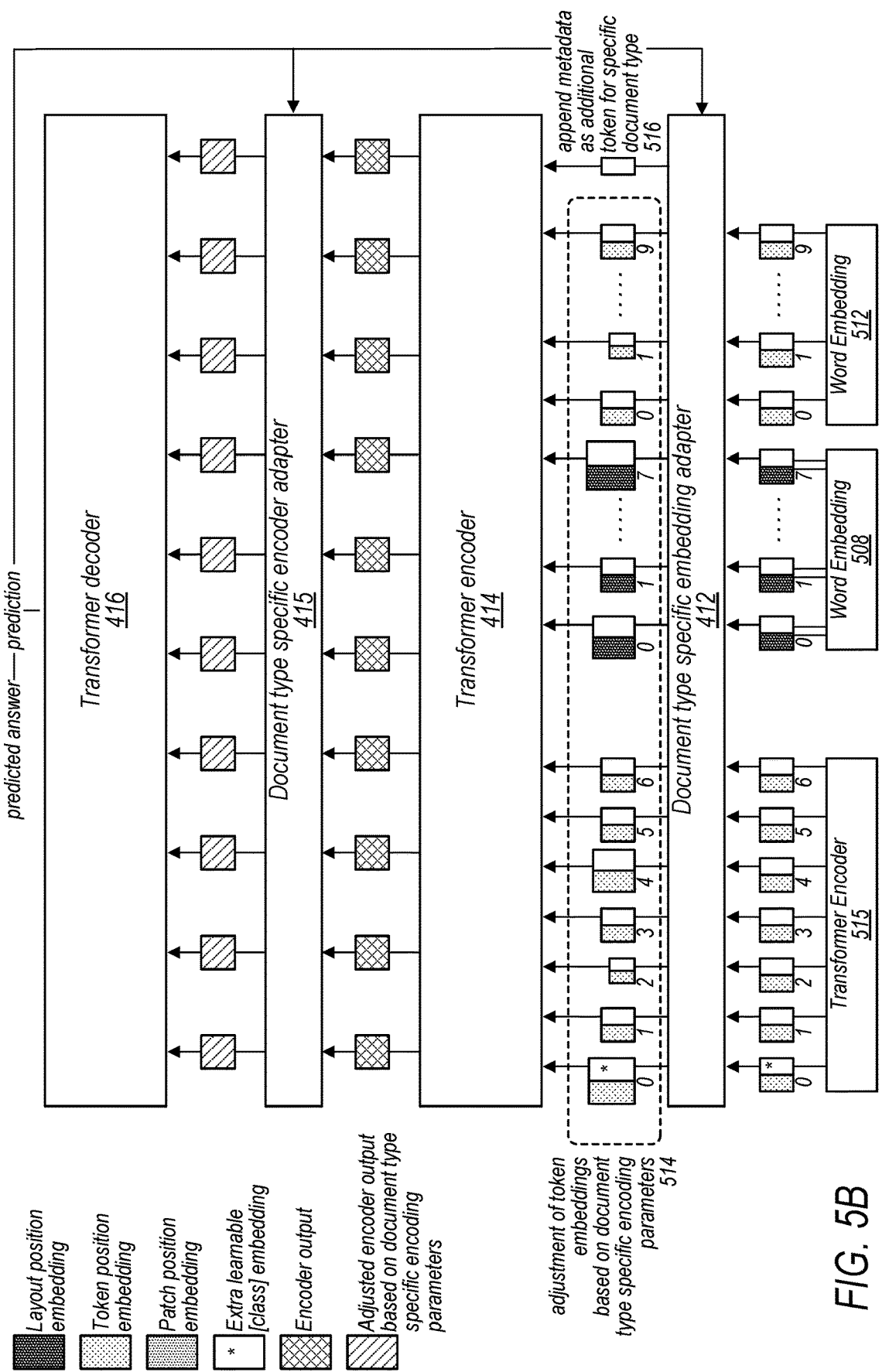
FIG. 5B illustrates a more detailed view of an example configuration of a portion of a document analysis system that adjusts token embeddings based on document type specific encoding parameters, adjusts encoder outputs based on the document type specific encoding parameters, and predicts answers to questions targeting information to be extracted from the document image based on the adjusted encoder output, according to some embodiments.

FIG. 5B illustrates a more detailed view of an example configuration of a portion of a document analysis system that adjusts token embeddings based on document type specific encoding parameters, adjusts encoder outputs based on the document type specific encoding parameters, and predicts answers to questions defining information to be extracted from the document image based on the adjusted encoder output, according to some embodiments.

In some embodiments, as discussed in FIG. 5A, the respective tokens may be generated from the VQA prompt comprising a document image and a query. The respective tokens may be generated using the word embedding module 508 that takes in identified characters of the document image, the word embedding module 512 that takes in words of the query, and using an optional transformer encoder 515. The document type specific embedding adapter may adjust the encoding of the respective token embeddings based on document type specific encoding parameters.

In some embodiments, the document type specific embedding adapter 412 may be a linear adapter that may be inserted into the transformer encoder 414 of the transformer model to adapt it to a new domain according to the specific document type. A linear adapter may comprise a linear transformation module that takes in one or more token embeddings and maps the respective token embeddings to an output space specific to the document type. For example, the linear adapter may include a linear transformation module that performs a matrix multiplication between the output of the pre-trained model and a learnable weight matrix that is specific to medical documents (or more specifically to vaccination cards). In some embodiments, the learnable weight matrix of the document type specific embedding adapter 412 may be fine-tuned on the new task-specific data specific to the document type. The linear adapter may be fine-tuned on a small amount of data specific to a given document type, while keeping the parameters of the transformer encoder 414 of the transformer model fixed. In some embodiments, the transformer encoder 414 of the transformer model may be frozen (wherein the weights of the encoder are not adjusted) while the document type specific embedding adapter 412 is being trained. The use of a linear adapter (or other types of document type specific embedding adapter 412) allows for efficient adaptation to new tasks for new document types without requiring the encoder of the transformation model to be retrained specifically for the new document types.

In some embodiments the document type specific embedding adapter 412 may perform adjustments of the token embeddings based on the document type specific encoding parameters 514. For example, the token embeddings 0-6 from the transformer encoder 515 may be adjusted according to the linear adapter weight matrix of the document type specific embedding adapter 412 and the linearly transformed token embeddings may be provided to the transformer encoder 415 to generate encoder output. In some embodiments, the document type specific embedding adapter 412 may be non-linear adapters, multi-head adapters, or other types of adapters that are directed towards a specific document type. In some embodiments, the adjustment of the token embeddings may be non-linear. For example, the token embeddings may subsequently be passed through a non-linear function of the document type specific embedding adapter 412 to introduce non-linearities into the adapter.

In some embodiments, the document type specific embedding adapter 412 may append metadata as additional tokens for a specific document type 516. For example, a vaccination card image may be provided with metadata identifying location information associated with the vaccination card image. The location metadata may be appended as additional tokens for the vaccination card document type. The additional tokens from the document type specific embedding adapter 412 may be encoded by the transformer encoder 415 and used as additional token inputs to determine the target information requested in the VQA prompt. In some embodiments, the metadata may be encoded as different kinds of tokens able to be processed by the multi-modal transformer to return a predicted answer to the user submitted question.

In some embodiments, the document type specific encoder adapter 415 may take in the encoder output and adjust the encoder output based on the document type specific encoding parameters. In some embodiments, the document type specific encoder adapter 415 may be a linear adapter similar to the document type specific embedding adapter configured to perform linear transformation. In some embodiments, the document type specific encoder adapter 415 may be one or various other types of adapters that may be used to adjust the encoder output, such as non-linear adapters or multi-head adapters.

The transformer encoder 416 and transformer decoder 416 may encode and decode inputs and outputs according to the model in order to generate a prediction. In some embodiments, a prediction may be provided back to the document type specific embedding adapter 412 and the document type specific encoder adapter 415 as an input for a further iteration to further fine-tune the parameters. For example, the document type specific embedding adapter 412 and the document type specific encoder adapter 415 may be further fine-tuned using document type specific encoding parameters (parameters that were trained using document type specific training data). The document type specific embedding/encoding adapters 412 and 415 may use the parameters (such as weight matrix) that were initialized randomly or were pre-defined based on the document type specific encoding parameters from the parameter pool. Backpropagation and gradient descent techniques may be applied to the document type specific embedding adapter 412 and the document type specific encoder adapter 415 to adjust the parameters to minimize the loss function for the specific document type. Document type specific adapters (such as linear adapters) may allow document specific analysis without having to specifically train the entire model from to accommodate an additional document type.

Figure 6:
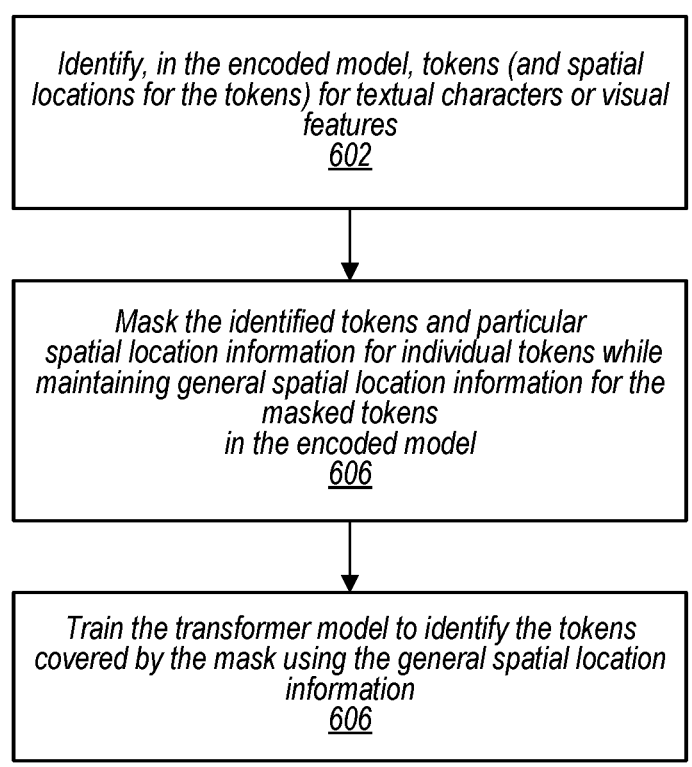
FIG. 6 is a flow diagram illustrating a process of pre-training a transformer model used in a document analysis system, according to at least some embodiments.

FIG. 6 is a flow diagram illustrating a process of pre-training a transformer model used in a document analysis system, according to at least some embodiments.

In some embodiments, transformer layers and token embedding layers are initialized using a pre-trained model that has been trained on textual information, such as the "common crawl" corpus of cleaned English language text. The model may further be trained on a dataset of images of documents. However, the training on documents (for the model that was already trained on text) may include a carefully designed spatial de-noising task, as described herein.

For each document page in the document pre-training data set, for a given OCR token $O_i$, the associated word bounding box may be defined by $(x_0^i, y_0^i, x_1^i, y_1^i, h_i, w_i)$, where $(x_0^i, y_0^i)$ corresponds to the position of the upper left corner of the bounding box, $(x_1^i, y_1^i)$ corresponds to the lower right corner, and $(h_i, w_i)$ represent the height and width with respect to the reading order. To embed the bounding box information a lookup table used for continuous encoding one-hot representations may be used, such as "nn.Embedding" in Pytorch. Note that the one hot representations may be representations of categorical variables expressed as binary vectors. Thus, the word tokens and associated spatial and/or visual information tokens may be represented as binary vectors.

In addition, prior to feeding the word representations (e.g., binary vectors) into the transformer encoder, the representations may be summed as follows:

$$\varepsilon_i = E_o(O_i) + E_x(x_0^i) + E_y(y_0^i) + E_x(x_1^i) + E_y(y_1^i) + E_w(w_i) + E_h(h_i)$$

In the above equation, $\varepsilon_i$ is the encoded representation for an OCR token $O_i$ and $E_o$, $E_x$, $E_y$, $E_w$, and $E_h$ are from learnable look-up tables.

The pre-training may effectively align the layout information (in the form of the 2-D spatial embedding) and the semantic representations. The pre-training comprises a layout-aware de-noising task, which includes the 2-D spatial embedding. This enables the use of weak data with no answer annotations to be used in the pre-training. Unlike other de-noising tasks, the layout-aware de-noising task provides the model with access to the rough location of masked tokens. This encourages the model to fully utilize the layout information when performing the layout-aware de-noising task.

More formally, let $O=\{O_1, O_2, \ldots, O_n\}$ and let their corresponding bounding boxes be $B=\{B_1, B_2, \ldots, B_n\}$, where $B_j = x_0^j, y_0^j, x_1^j, y_1^j, h_j, w_j$. Also, let mask $M_l = \{j, j+1, \ldots, j+k\}$ be the l-th mask span where j is the starting index of the mask, such that $\max(M_l) < \min(M_{l+1})$. Next, to perform the pre-training task for layout aware de-noising, the tokens and their corresponding bounding boxes in the training data are replaced with a special index masked token $\tilde{O}_l$ and that spans minimal containing bounding box $\tilde{B}_l$.

Essentially, the span of words tokens $\{O_1, O_2, \ldots, O_n\}$ and their corresponding bounding boxes $\{B_1, B_2, \ldots, B_n\}$ are replaced with a special token $\tilde{O}_l$ and a corresponding "loose" bounding box $\tilde{B}_l$. In other words, the span of words is masked, and the minimum of the top left coordinates of each word in the span of words and the maximum of the top right coordinates of each word in the span of words as the top left and bottom right coordinates are selected as the coordinates for the "loose" bounding box $\tilde{B}_i$. The reasons for this are two-fold. First, it is desirable for the model to not know the precise token bounding boxes for each individual word, because that would reveal how many words are masked. Also, it is desirable to not mask bounding box information completely, because if that were done, the model would not know where the text should appear in the document and would not be able to use correct spatial context effectively. The disclosed masking approach used in pre-training may prevent the model from taking shortcuts (such as knowing the total number of masked words by counting the bounding boxes), but at the same time may give the model enough spatial information to learn spatial contexts. The masked tokens $\tilde{O}_i$ and their corresponding bounding boxes $\tilde{B}_i$ are embedded using the equation for $\varepsilon_i$, like any other regular token. Cross-entropy loss is then used to predict the masked tokens' original text. This prediction can then be compared to the tokens under the mask to determine mis-alignments which may further be used to train the model.

For example, at block 602, tokens and corresponding spatial locations of the tokens are identified for textual characters (e.g., words) or visual features. At block 604, the identified tokens and particular spatial locations of the identified tokens are masked while maintaining general spatial location information for the masked tokens. At block 606, the model is trained to identify the tokens covered by the mask using the general spatial location information.

FIG. 7 illustrates an example scanned image (e.g. medical document) that may be included in a visual question answering (VQA) prompt as a document image, according to at least some embodiments. For example, the encoder/decoder of the transformer model may be trained to identify textual information in a vaccination card, wherein the text does not necessarily conform to a standard layout, such as the sticker. In some embodiments, the encoder/decoder of the transformer model may not be trained to support VQA for document images of the medical document type. As discussed above in FIGS. 1-5, document type specific adapters may be used to adjust the encoding of medical document image and questions directed towards the medical document type.

Figure 8B:
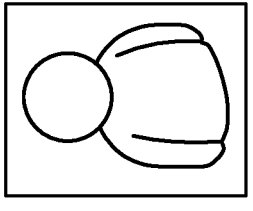
FIGS. 8A and 8B illustrate another example scanned image (e.g. government document) that may be included in a visual question answering prompt as a document image, according to at least some embodiments.
Figure 8A:

FIGS. 8A and 8B illustrate another example scanned image (e.g., government document) that may be included in a visual question answering prompt as a document image, according to at least some embodiments. In some embodiments, the encoder/decoder of the transformer model may be trained to infer keys related to government document data. For example, in a driver license shown in FIGS. 8A and 8B, the answer to the address question may be inferred even though the ID does not include an "address" field. In some embodiments, the encoder/decoder of the transformer model may not be trained to support VQA for document images of the government document type. As discussed above in FIGS. 1-5, document type specific adapters may be used to adjust the encoding of government document image and questions directed towards the government document type.

FIGS. 9A and 9B illustrate an example scanned image (e.g., expense document) that may be included in a visual question answering prompt as a document image, according to at least some embodiments. In a similar manner as the driver license shown in FIGS. 8A and 8B, with regard to other scanned images, such as a receipt shown in FIGS. 9A and 9B, a vendor (or other expense document type specific data) may be inferred based on the placement of the text on the receipt even though there is no label that labels the text as "vendor." Also, in some embodiments, the identity of the vendor may be inferred based on a symbol, such as a logo, which may not include text or may include text and other visual features. In some embodiments, the encoder/decoder of the transformer model may not be trained to support VQA for document images of the expense document type. As discussed above in FIGS. 1-5, document type specific adapters may be used to adjust the encoding of expense document image and questions directed towards the expense document type.

Figure 10:
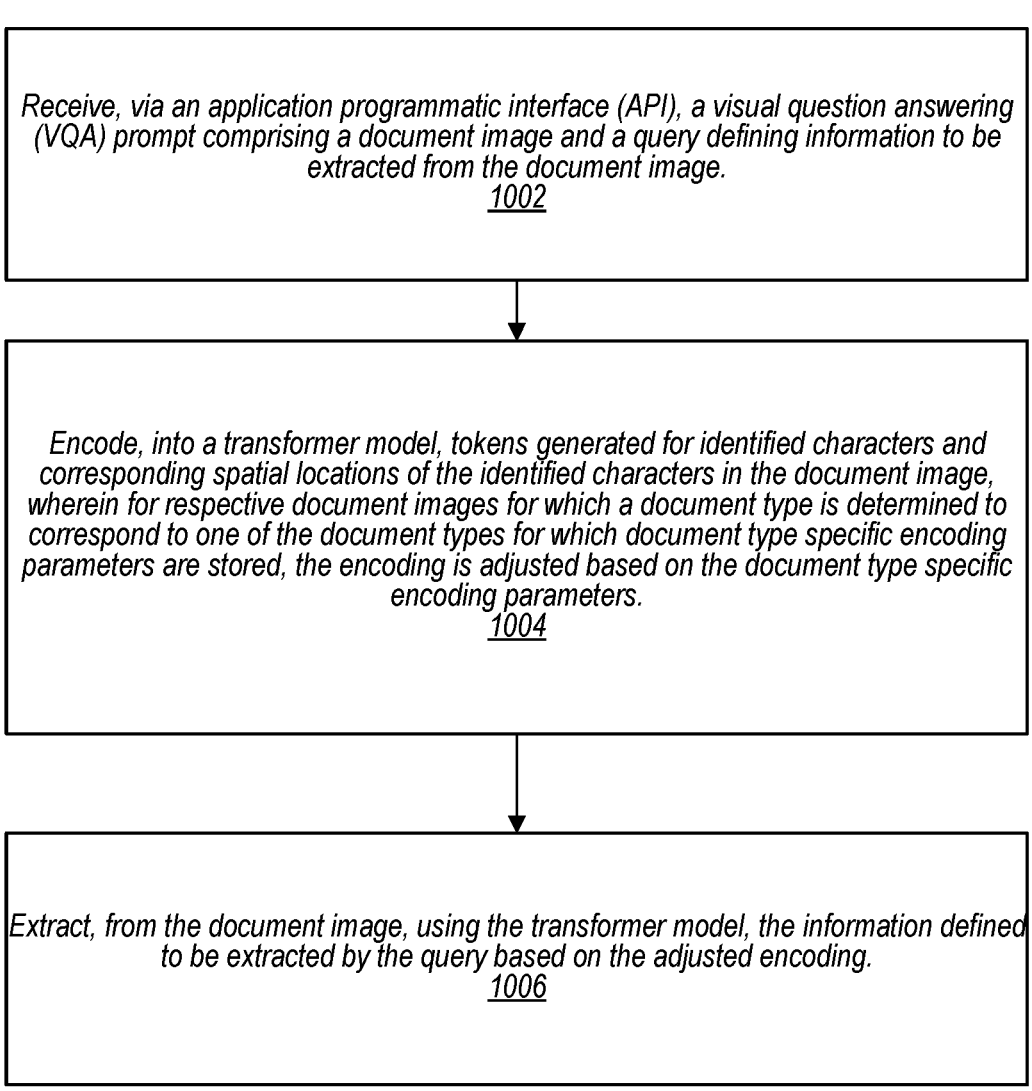
FIG. 10 is a flow diagram illustrating a process of extracting information from a document image using tokens generated based on the document image and a question defining information to be extracted from the document image, and adjusting the tokens based on document type specific encoding parameters, according to some embodiments.

FIG. 10 is a flow diagram illustrating a process of extracting information from a document image using tokens generated based on the document image and a question defining information to be extracted from the document and adjusting the tokens based on document type specific encoding parameters, according to some embodiments.

At block 1002, a document analysis service may receive, via an application programmatic interface (API), a visual question answering (VQA) prompt comprising a document image and a query defining information to be extracted from the document image. In some embodiments, the document image may be an additional document type that is unsupported by the encoder/decoder of a transformer model (e.g., a given document type is considered to be unsupported as VQA performance of the transformer model for the given document types does not meet a threshold performance level) as discussed in FIG. 2.

At block 1004, a document analysis service may encode, into a transformer model, tokens generated for identified characters and corresponding spatial locations of the identified characters in the document image, wherein for respective document images for which a document type is determined to correspond to one of the document types for which document type specific encoding parameters are stored, the encoding is adjusted based on the document type specific encoding parameters. In some embodiments, a document type specific embedding adapter may adjust weights of the token embeddings based on the document type specific encoding parameters. In some embodiments, the document type specific embedding adapter may be a light-weight linear adapter that comprises a linear transformation module that takes in one or more token embeddings and maps the one or more token embeddings to an output space specific to the document type as further discussed in FIGS. 4-5. In some embodiments, the document type specific encoding parameters may further be adjusted based on results of a predicted answer from the decoder of the transformation model as further discussed in FIG. 5B.

At block 1006, a document analysis service may extract, from the document image, using the transformer model, the information defined to be extracted by the query based on the adjusted encoding. In some embodiments, a document type specific encoding adapter may adjust encoding outputs of the encoder of the transformer model according to a weight matrix of the document type specific embedding adapter as discussed in FIG. 5B.

Example System Environment

Figure 11:
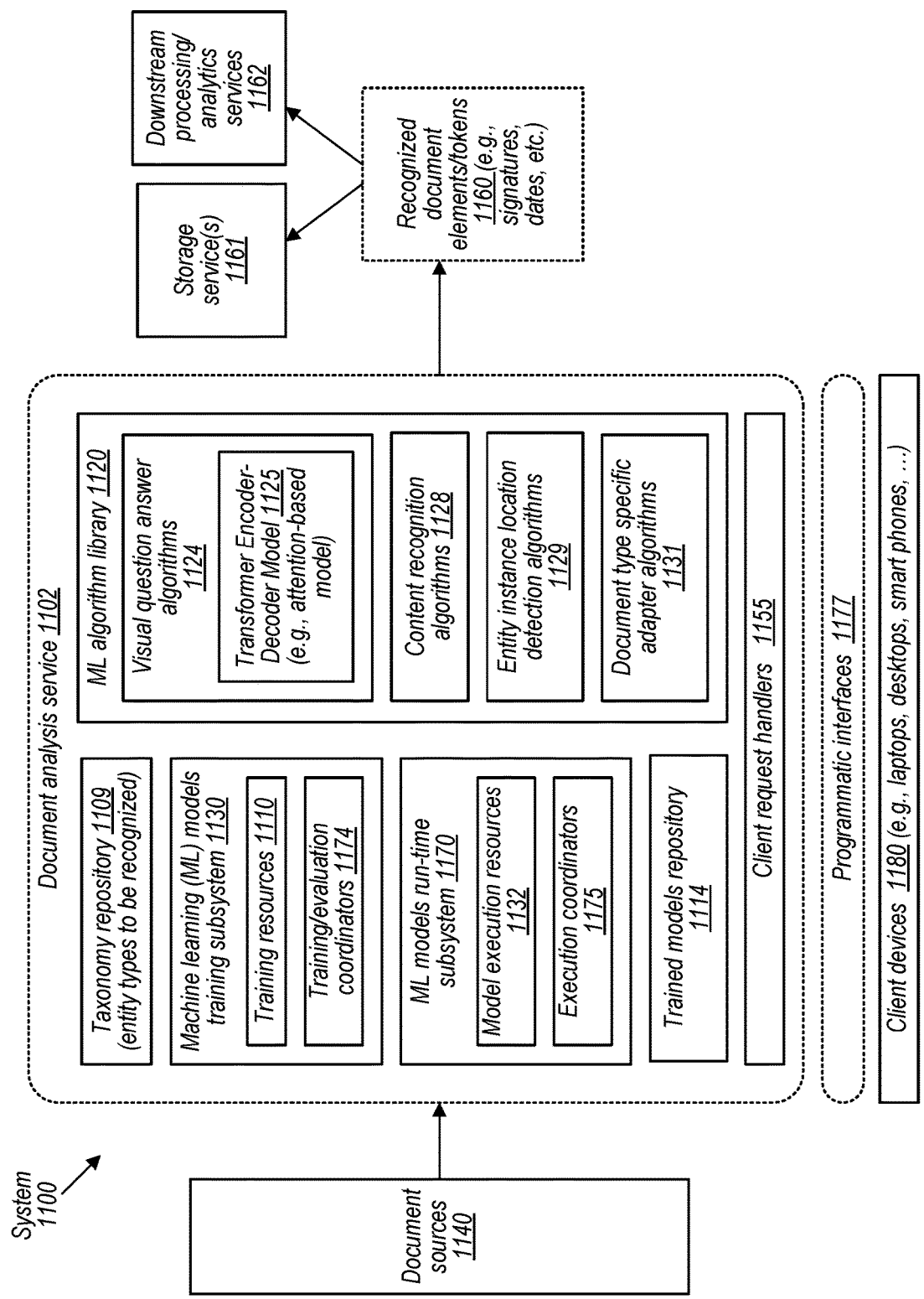
FIG. 11 illustrates components of an example document analysis service that implements visual question answering (VQA) using document type specific adapters, according to at least some embodiments.

FIG. 11 illustrates components of an example document analysis service that implements visual question answering (VQA) using document type specific adapters, according to at least some embodiments. As shown, system 1100 comprises resources and artifacts of a document analysis service 1102 at which one or more types of machine learning models are employed to detect and recognize contents of documents. In the depicted embodiment, images (e.g., scans or photographs) of numerous documents may be obtained from one or document sources 1140 and used to train the machine learning models at training subsystem 1130. The trained models may be stored within one or more repositories 1114, and executed at run-time subsystem 1170 to produce recognized document elements or tokens 1160 of various documents which were not included in the training data.

The document analysis service 1102 may implement one or more programmatic interfaces 1177 in the depicted embodiment, such as web-based consoles, application programming interfaces (APIs), command-line tools, graphical user interfaces and the like. The programmatic interfaces 1177 may be utilized by clients of the document analysis service to submit various types of requests from client devices 1180 (e.g., laptops, desktops, smart phones, other mobile computing devices and the like) and receive corresponding responses. Within the document analysis service 1102, a set of client request handlers 1155 may receive the programmatic requests submitted by clients, and send corresponding internal messages to other components of the service to perform the work requested.

A number of different types of machine learning algorithms of library 1120 may be employed, singly or in combination, to analyze and extract content from documents in various embodiments. Such algorithms may be broadly categorized as visual question answering algorithms 1124, content recognition algorithms 1128, and entity instance location detection algorithms 1129 in the depicted embodiment. For each of the different algorithm categories, in some embodiments respective collections of one or more models may be trained at the training subsystem to perform corresponding respective sets of tasks. In at least some embodiments one or more of the algorithm types 1124 (including transformer encoder-decoder model 1125 discussed above), 1128 and 1129 may utilize attention-based networks, although other types of model architectures and approaches may also or instead be used for one or more of the document analysis sub-tasks in other embodiments. The visual question answering algorithms 1124 may be used to extraction various types (such as signatures, dates, address fields, and so on) of information contained within document images, based on a user provider question, without providing other information included in the documents images that were not targeted by the user provided question. The location detection algorithms 1129 (also referred to as localization algorithms) may be used to detect the approximate locations of instances or examples of various entity types (such as signatures, dates, address fields, and so on) within document images, without actually identifying the lower-level contents (e.g., individual characters or symbols) within the instances. Models implementing the content recognition algorithms 1128 may obtain representations of candidate locations of the instances from the entity instance location models 1129, and identify the lower-level content elements within the candidate locations in various embodiments. In some embodiments, for example, in which individual images/scans of input documents or document pages are assumed to be rectangular in shape, the location detection models may indicate locations as bounding boxes specified using Cartesian coordinates, with the coordinate axes being aligned with edges of the document images/scans. For at least some of the bounding boxes, a corresponding entity type may be indicated by the location detection algorithm as well in at least one embodiment. Within the various bounding boxes indicated by the location detection model, the content recognition model(s) may attempt to identify language tokens which (taken together) make up an instance of an entity type (e.g., the entity type suggested by the location detection model). In some embodiments, machine learning algorithms of library 1120 may further include document type specific adapter algorithms 1131 that may be used to support document specific analysis for additional document types, as discussed above. For example, the document type specific adapter algorithms 1131 may include algorithms corresponding to tuning of document type specific parameters as discussed in FIG. 5B.

According to some embodiments, a client of the document analysis service 1102 may use interfaces 1177 to provide programmatic indications of (a) one or more data sets to be used for training document analysis models on the client's behalf and (b) a visual question answering prompt comprising a document image and corresponding question for information to be detected or identified within documents using the models. Any of a wide variety of entity types may be selected or indicated by a client in different embodiments, including but not limited to dates, signatures, representations of handwritten text, URLs (Uniform Resource Locator) or URIs (Uniform Resource Identifier) type, emails, alphanumeric string type, single characters, postal addresses, postal codes, phone numbers, tables, table cells, images (embedded within the document image), equations, emojis (also referred to as emoticons), currency symbols and the like. In some cases, one or more entity types may comprise non-text content (for example, images embedded within a document may not necessarily contain recognizable text). In at least one embodiment, a client may define a custom entity type of interest (e.g., an entity type with begins with a specified combination of upper and lower-case letters), and models may be trained at the document analysis service 1102 to detect and recognize contents of instances of such custom entities. Some entity type collections specified by clients may include hierarchical relationship information—e.g., entity types E1 and E2 may be indicated as being child entities of another entity E3, and so on. Different clients may be interested in the detection of respective combinations of entity types in some embodiments—that is, not all clients may wish to utilize models that are trained to detect the same set of entities. The collections of entities of interest to different clients may be referred to as taxonomies, and representations of the entity types may be stored within a repository 1109 in the depicted embodiment. Note that in some embodiments, models may be trained for a default set of entity types for those clients who do not wish to specify any particular combination of entity types of interest.

The training subsystem 1130 may comprise a set of training resources 1110 (e.g., physical or virtual machines) which may be utilized to train models implementing the algorithms 1124, 1128 and/or 1129 in the depicted embodiment. Training/evaluation coordinators 1174 implemented at one or more computing devices may be configured to orchestrate the training process, e.g., by organizing training epochs, determining/tuning hyper-parameter values, and so on. In at least some embodiments, the models trained at subsystem 1130 may include models comprising one or more transformer encoder/decoder of the transformer model. In some embodiments, the models trained at subsystem 1130 may include document type specific adapters.

After the training is complete, the trained versions of the encoder/decoder of the transformer model and/or the document type specific adapters, the content recognition models, and/or the entity instance location models may be stored in repository 1114 of the document analysis service. The trained versions of the models may be executed (e.g., by execution coordinators 1175 using model execution resources 1132 of the run-time subsystem 1170) to identify language tokens or other elements 1160 of the content of target documents submitted via programmatic interfaces 1177 in various embodiments. In at least some embodiments, the recognized elements may be stored within one or more storage services 1161 and/or transmitted for further analysis at downstream processing/analytics services 1162. For example, if a document was expected to contain a signature, and the recognized elements 1160 corresponding to that document do not include a signature, a corrective action may be initiated at such a downstream analytics service—e.g., the submitter of the document may be notified regarding the missing signature.

Example Provider Network

Figure 12:
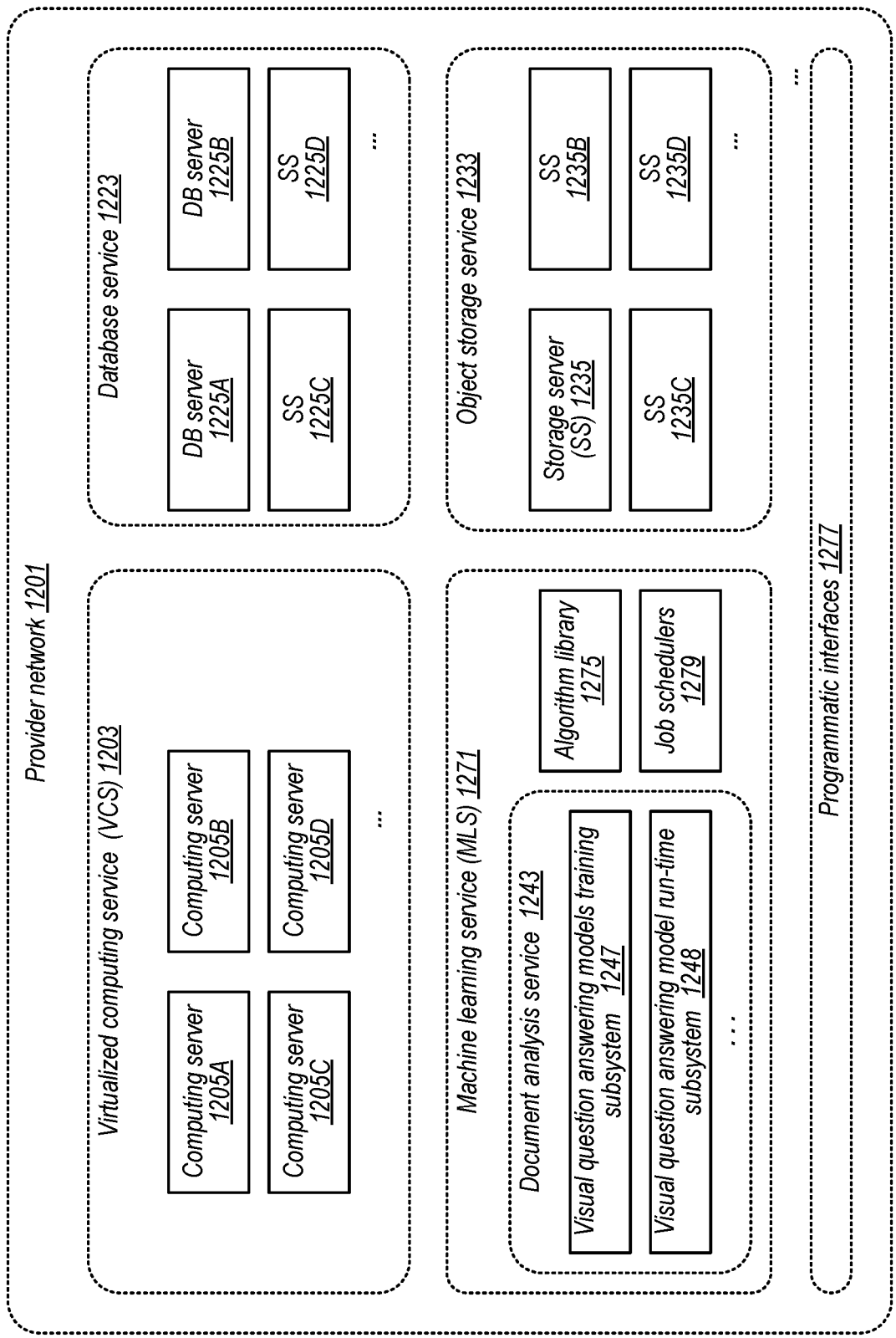
FIG. 12 illustrates an example provider network environment, according to at least some embodiments.

In at least some embodiments, a document analysis service at which visual question answering of the kind discussed herein is performed may be one of a suite of services of a provider network. FIG. 12 illustrates an example provider network environment, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries. For example, a cloud provider network can be formed as a number of regions, where a region is a geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In the embodiment depicted in FIG. 12, provider network 1201 includes a virtualized computing service 1203, and a database service 1223, and an object storage service 1233 as well as a machine learning service 1271 comprising a document analysis service 143 (similar in features and functionality of the document analysis service described in FIGS. 1-11). The document analysis service 1243 may include a training subsystem 1247 as well as a run-time subsystem 1248. The machine learning service 1271 may include an algorithm library 1275 (which includes code and artifacts for algorithms similar to the encoder/decoder of the transformer model and/or the document type specific adapters discussed earlier, as well as other neural network-based models used for content recognition, entity instance location detection and the like) as well as one or more job schedulers 1279 responsible for orchestrating long running machine learning tasks in the depicted embodiment.

Each of the services of provider network 1201 may include a respective set of computing devices and/or other resources in some embodiments. Components of a given service may utilize components of other services in the depicted embodiment—e.g., compute instances (CIs) (such as guest virtual machines) set up at the computing servers 1205 (e.g., 1205A-1205D) of the virtualized computing service 1203 and/or storage servers 1235 (e.g., 1235A-1235D of an object storage service 1233 may be employed by various other services of provider network 1201 (including the document analysis service 1243) to implement their respective functions. Also, the database service 1223 may include multiple resources such as database servers 1225A and 1225B, and storage servers 1225C and 1225D. Individual ones of the services shown in FIG. 12 may implement a respective set of programmatic interfaces 1277 which can be used by external and/or internal clients (where the internal clients may comprise components of other services) in the depicted embodiment. Individual ones of the services shown in FIG. 12 may each provide high levels of automated scalability, availability, data durability, and failure resilience, enabling varying levels of workloads to be handled gracefully.

Illustrative Computer System

Figure 13:
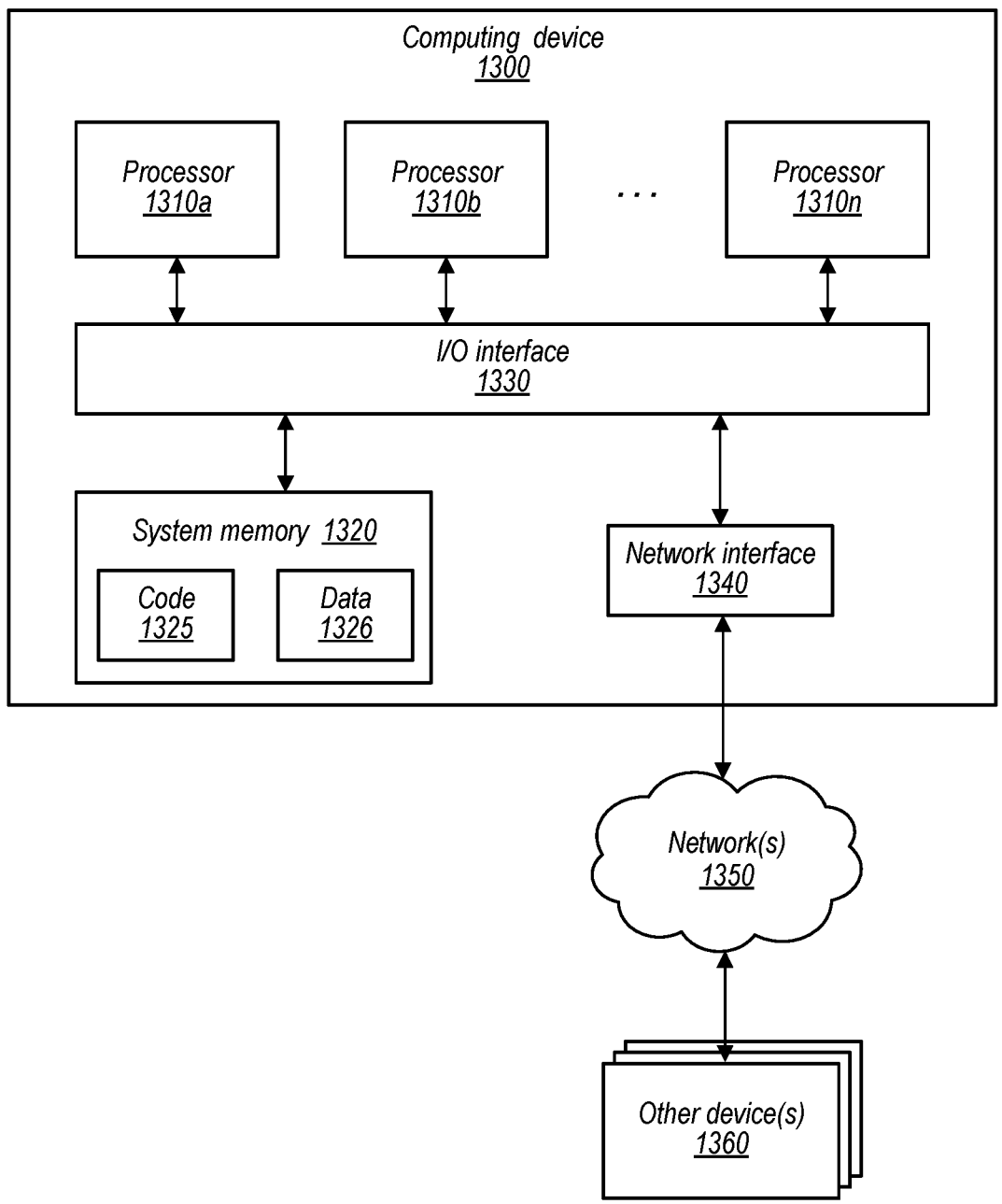
FIG. 13 is a block diagram illustrating an example computing device that may be used in at least some embodiments.

In at least some embodiments, a server that implements one or more of the techniques described herein, including for example components of a document analysis service, a machine learning service and the like may include a general-purpose computer system that includes or is configured to access one or more computer-accessible media. FIG. 13 illustrates such a general-purpose computing device 1300. In the illustrated embodiment, computing device 1300 includes one or more processors 1310 coupled to a system memory 1320 (which may comprise both non-volatile and volatile memory modules) via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors.

System memory 1320 may be configured to store instructions and data accessible by processor(s) 1310. In at least some embodiments, the system memory 1320 may comprise both volatile and non-volatile portions; in other embodiments, only volatile memory may be used. In various embodiments, the volatile portion of system memory 1320 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a document content extraction service, wherein to implement the document content extraction service the one or more computing devices are configured to:
store a plurality of document type specific encoding parameters for a plurality of types of documents;
receive, via a user interface, a visual question answering (VQA) prompt comprising a document image and a query defining information to be extracted from the document image;
determine, based on the document image and the query, whether a document type of the document image associated with the VQA prompt is one of the plurality of types of documents for which document type specific encoding parameters are stored;
encode, into a transformer model, tokens generated for identified characters and corresponding spatial locations of the identified characters in the document image, wherein for respective document images for which a document type is determined to correspond to one of the document types for which document type specific encoding parameters are stored, the encoding is adjusted based on the document type specific encoding parameters; and
determine from the document image, using the transformer model, the information to be extracted as defined by the query based on the adjusted encoding.

2. The system of claim 1, wherein to determine whether the document type of the document image associated with the VQA prompt is one of the document types for which document specific encoding parameters are stored, the one or more computing devices are configured to:
predict for the document image a given document type or predict that the document image does not correspond to a stored document type;
determine, in response to predicting the document image is the given document type, that the query included in the VQA prompt corresponds to a known query stored for the given document type; and
classify the document image as the given document type based on the determination that the query corresponds to the known query stored for the given document type.

3. The system of claim 1, wherein to adjust the encoding based on the document type specific encoding parameters the one or more computing devices are configured to:
adjust, using an embedding adapter model of the system:
tokens generated based on the query, and
the tokens generated for identified characters and corresponding spatial locations,
wherein the embedding adapter model is trained using the document type specific encoding parameters; and
encode the adjusted tokens using an encoder of the transformer model.

4. The system of claim 3, wherein training of the encoder of the transformer model is not active or is suspended when training the embedding adapter model.

5. The system of claim 1, wherein to determine whether the document type of the document image associated with the VQA prompt is one of the document types for which document specific encoding parameters are stored, the one or more computing devices are configured to:
predict for the document image a given document type or predict that the document image does not correspond to a stored document type;
determine, in response to predicting the document image is the given document type, that the query included in the VQA prompt does not correspond to a known query stored for the given document type; and
classify the document image as an unknown document type based on the determination that the query does not correspond to the known query stored for the given document type.

6. The system of claim 1, wherein the one or more computing devices are configured to:
in response to determining the document image does not correspond to one of the plurality of document types for which document specific encoding parameters are stored, classify the document image as an unknown document type based on the determination that the VQA prompt is not associated with the another document type.

7. A method, comprising:
receiving, via an application programmatic interface (API), a visual question answering (VQA) prompt comprising a document image and a query defining information to be extracted from the document image;
encoding, into a transformer model, tokens generated for identified characters and corresponding spatial locations of the identified characters in the document image, wherein for respective document images for which a document type is determined to correspond to one of the document types for which document type specific encoding parameters are stored, the encoding is adjusted based on the document type specific encoding parameters; and extracting, from the document image, using the transformer model, the information defined to be extracted by the query based on the adjusted encoding.

8. The method of claim 7, further comprising:
storing a plurality of document type specific encoding parameters for a plurality of types of documents; and
determining, based on the document image and the query, whether a document type of a document associated with the VQA prompt is one of the plurality of types of documents for which document type specific encoding parameters are stored.

9. The method of claim 8, further comprising:
storing a list of known questions for respective ones of the plurality of types of documents for which document type specific encoding parameters are stored.

10. The method of claim 8, wherein determining whether the document type of the document image associated with the VQA prompt is one of the document types for which document specific encoding parameters are stored comprises:
predicting for the document image a given document type or predicting that the document image does not correspond to a stored document type;
determining, in response to predicting the document image is the given document type, that the query included in the VQA prompt corresponds to a known query stored for the given document type; and
classifying the document image as the given document type based on the determination that the query corresponds to the known query stored for the given document type.

11. The method of claim 8, wherein the plurality of types of documents for which the document type specific encoding parameters are stored comprise one or more of: financial documents, medical documents, government documents, or expense documents.

12. The method of claim 7, wherein adjusting the encoding based on the document type specific encoding parameters comprises:
adjusting, using an embedding adapter model:
tokens generated based on the query, and
the tokens generated for identified characters and corresponding spatial locations,
wherein the embedding adapter model is trained using the document type specific encoding parameters; and
encoding the adjusted tokens using an encoder of the transformer model.

13. The method of claim 12, further comprising:
adjusting one or more outputs from the encoder based on an encoder adapter model, wherein the encoder adapter model is trained using the document type specific encoding parameters; and
decoding the adjusted outputs using a decoder of the transformer model, wherein training of the decoder is not active or is suspended when training the encoder adapter model.

14. The method of claim 13, wherein adjustments performed by the embedding adapter model and the encoder adapter model are based on linear transformations.

15. The method of claim 7, wherein adjusting the encoding based on the document type specific encoding parameters comprises:
determining, using an embedding adapter model, additional tokens associated with the document specific encoding parameters, wherein the embedding adapter model is trained using the document type specific encoding parameters; and encoding, into the transformer model, the additional tokens as metadata.

16. The method of claim 7, wherein said encoding further comprises:
encoding, into the transformer model, generated tokens for visual features of the document image and corresponding spatial locations in the document image for the visual features.

17. The method of claim 16, wherein the tokens for the visual features are generated using a region-based convolutional neural network, wherein regions are localized to regions comprising characters included in the document image.

18. The method of claim 7, wherein the transformer model comprises an encoder and a decoder, and wherein the transformer model is an attention-based model.

19. One or more non-transitory, computer-readable storage media, storing program instructions that, when executed on or across one or more processors, cause the one or more processors to:
receive, via an application programmatic interface (API), a visual question answering (VQA) prompt comprising a document image and a query defining information to be extracted from the document image;
encode, into a transformer model, tokens generated based on the query and tokens generated for identified characters and corresponding spatial locations of the identified characters in the document image, wherein for VQA prompts that are associated with a given document type for which document type specific encoding parameters of a plurality of document specific encoding parameters are stored, and wherein the encoding is adjusted based on the document type specific encoding parameters; and
extract, from the document image, using the transformer model, the information defined by the query to be extracted from the document image based on the adjusted encoding.

20. The one or more non-transitory, computer-readable, storage media of claim 19, wherein to adjust the encoding based on the document type specific encoding parameters the program instructions, when executed on or across the one or more processors, cause the one or more processors to:
adjust, using an embedding adapter model:
tokens generated based on the query, and
the tokens generated for identified characters and corresponding spatial locations,
wherein the embedding adapter model is trained using the document type specific encoding parameters; and
encode the adjusted tokens using an encoder of the transformer model.

* * * * *